US 10,384,885 B2

(12) United States Patent
Buse (10) Patent No.: US 10,384,885 B2
(45) Date of Patent: Aug. 20, 2019

(54) APPARATUS FOR SEPARATING BULK MATERIAL

(71) Applicant: Heinz Buse, Bad Zwischenahn (DE)

(72) Inventor: Heinz Buse, Bad Zwischenahn (DE)

( * ) Notice: Subject to any disclaimer, the term of this patent is extended or adjusted under 35 U.S.C. 154(b) by 0 days.

(21) Appl. No.: 15/746,150

(22) PCT Filed: Jul. 18, 2016

(86) PCT No.: PCT/EP2016/067046
§ 371 (c)(1),
(2) Date: Jan. 19, 2018

(87) PCT Pub. No.: WO2017/013057
PCT Pub. Date: Jan. 26, 2017

(65) Prior Publication Data
US 2018/0208408 A1    Jul. 26, 2018

(30) Foreign Application Priority Data

Jul. 20, 2015 (DE) .................. 10 2015 213 644

(51) Int. Cl.
*B65G 47/42* (2006.01)
*B65G 47/53* (2006.01)
(Continued)

(52) U.S. Cl.
CPC ........... *B65G 47/681* (2013.01); *B65G 47/42* (2013.01); *B65G 47/53* (2013.01); *B65G 47/57* (2013.01);
(Continued)

(58) Field of Classification Search
CPC ......... B65G 47/42; B65G 47/53; B65G 47/57
(Continued)

(56) References Cited

U.S. PATENT DOCUMENTS 4,628,665 A * 12/1986 Herrington ............. B65B 43/42
198/447
4,955,175 A * 9/1990 Herrington ............. B65B 43/42
198/447
(Continued)

FOREIGN PATENT DOCUMENTS

DE    102005044925 A1    4/2006
EP        2316760 A1    5/2011
(Continued)

OTHER PUBLICATIONS

International Searching Aurhority, Search Report and Written Opinion issued in International Application No. PCT/EP2016/067046 dated Sep. 29, 2016 (17 pages).

*Primary Examiner* — Douglas A Hess
(74) *Attorney, Agent, or Firm* — Wood Herron & Evans LLP (57) ABSTRACT

An apparatus is provided for separating bulk material, in particular in the form of packages, from a bulk material container. The apparatus has a first belt conveyor for conveying the bulk material from a bulk material container, and a downstream second belt conveyor, oriented at an angle about a vertical axis, relative to the conveying direction of the first belt conveyor, for conveying away the bulk material. The first belt conveyor has a plurality of separately actuatable discharging conveyor belts arranged parallel to one another. The apparatus has an electronic control device which is configured to drive the discharging conveyor belts in each case intermittently such that units of the bulk material are each transferred to the second belt conveyor at discrete time intervals and/or distances.

19 Claims, 8 Drawing Sheets

(51) Int. Cl.
*B65G 47/57* (2006.01)
*B65G 47/68* (2006.01)

(52) U.S. Cl.
CPC ................ *B65G 2201/047* (2013.01); *B65G 2203/0208* (2013.01); *B65G 2203/044* (2013.01)

(58) Field of Classification Search
USPC .... 198/370.06, 443, 447, 464.1, 464.2, 571, 198/575, 576, 579; 700/228, 229, 230
See application file for complete search history.

(56) References Cited

U.S. PATENT DOCUMENTS

| | | | | |
|---|---|---|---|---|
| 5,161,665 | A * | 11/1992 | Cragun | B65G 47/682 198/419.3 |
| 5,779,023 | A | 7/1998 | Hidai et al. | |
| 6,471,044 | B1 * | 10/2002 | Isaacs | B65G 43/08 198/347.4 |
| 7,156,606 | B2 * | 1/2007 | Bridier | B65B 35/44 198/447 |
| 7,695,235 | B1 * | 4/2010 | Rallis | B65G 67/20 414/280 |
| 8,757,363 | B2 * | 6/2014 | Combs | B65G 43/10 198/781.01 |
| 9,199,799 | B2 * | 12/2015 | Neiser | B65G 43/00 |
| 9,429,930 | B2 * | 8/2016 | Winkler | B65G 1/1378 |
| 9,555,978 | B1 * | 1/2017 | Hanssen | B65G 1/1378 |
| 9,624,043 | B2 * | 4/2017 | Koetje | B65G 47/681 |
| 9,739,958 | B2 * | 8/2017 | Ma | G02B 6/4292 |
| 9,771,222 | B2 * | 9/2017 | Schroader | B65G 43/08 |
| 2002/0005333 | A1 | 1/2002 | Mondie et al. | |

FOREIGN PATENT DOCUMENTS

| | | |
|---|---|---|
| JP | 2012246079 A | 12/2012 |
| WO | 2013087413 A1 | 6/2013 |

\* cited by examiner

APPARATUS FOR SEPARATING BULK MATERIAL

CROSS-REFERENCE TO RELATED APPLICATIONS

This application in a national phase of PCT/EP2016/067046, filed on Jul. 18, 2016, which claims priority to German Application No. 102015213644.2, which was filed Jul. 20, 2015. These prior applications are incorporated herein by reference, in their entireties.

TECHNICAL FIELD

The present invention relates to an apparatus for separating bulk material, such as packages, from a bulk material container.

BACKGROUND

In modern logistics processes, there are increasingly transport operations in which articles are not transported individually but as what is known as bulk material, also referred to as "bulk cargo" in the industry. In the process, a large number of individual articles are loaded or stacked in bulk in large containers.

While transporting articles as bulk material is highly efficient economically as regards just the transport process, the further processing of such articles sometimes causes difficulties logistically.

It is of essential importance for modern logistics chains that the loads of articles which are transported to handling facilities can be removed from their transport containers in as little time as possible with as little damage to the articles as possible, and can be transferred, resorted and output again in the handling center.

To this end, it is necessary to separate the bulk material for it to be possible to individually process predetermined quantities of the material or individual units of the material in a targeted manner. A typical application for this is the processing of packages or parcels in what are known as parcel centers.

Systems for unloading bulk material containers, for example on load carriers, and transferring the bulk material to conveying systems are known, for example from WO 2013/087413 A1. With the system described therein, the bulk material is already advantageously transferred out of the bulk material container and into the conveying system in a short time and in an undamaged form.

However, there is still a need to achieve as efficient separation as possible of the bulk material being transferred.

Known problems in facilities for separating bulk material are generally considered to be that the uncontrolled inflow of bulk material from the bulk material container causes backlogs of articles between the inlet into the system and the outlet, and these compromise the logistics process.

Against this background, the invention was based on the problem of specifying an apparatus of the type designated at the beginning, which allows as efficient and disruption-free provision of separated units of bulk material as possible.

SUMMARY

The present invention specifies an apparatus having a first belt conveyor for conveying the bulk material applied to the first belt conveyor from a bulk container, and a downstream second belt conveyor, oriented at an angle about a vertical axis, preferably transversely, to the conveying direction of the first belt conveyor, for conveying away the bulk material, wherein the first belt conveyor has a plurality of separately actuatable discharging conveyor belts arranged parallel to one another, wherein the apparatus has an electronic control device which is configured to drive the discharging conveyor belts in each case intermittently such that units of the bulk material are each transferred to the second belt conveyor at discrete time intervals and/or distances.

The invention takes advantage of the finding that the initially undefined and variable mass flow of the bulk material is transferred from the multiplicity of parallel conveyor belts of the first belt conveyor to the second belt conveyor by the respective conveyor belts in small individual steps. As a result of discrete time intervals and/or distances being maintained between the individual discharging events (transfer events from the first belt conveyor to the second belt conveyor), the system can be discretized without any narrowing of the conveyed stream of the bulk material in the manner of a bottleneck being necessary. The invention takes the approach here that the electronic control device does not drive the conveyor belts of the first belt conveyor in a permanently synchronous manner, but in a targeted and intermittent manner such that aggregations of several packages no longer occur on the second belt conveyor, but rather already separated units of the bulk material.

Thus, the invention is based on the finding that, for an ideal process sequence, gaps that are as small as possible between the individual units of the bulk material already arise on the second belt conveyor, while at the same time, because of the discrete time intervals and/or distances between the operation of the individual conveyor belts, "clogging" of the second belt conveyor is prevented.

The invention is developed advantageously in accordance with the preferred embodiments described in the following text.

In a first advantageous development, the discharging conveyor belts of the first belt conveyor are arranged in a row next to one another along a common discharging edge facing the second belt conveyor, wherein the discharging edge is oriented with respect to the second belt conveyor such that the bulk material passes onto the second belt conveyor after passing over the discharging edge. Preferably, the discharging conveyor belts are arranged in a manner directly adjoining one another. Since all the conveyor belts are able to be driven individually and intermittently, even units of the bulk material that do not come to lie exactly on only one conveyor belt end up pushed into a correct position as a result of the intermittent, individual driving of the conveyor belts until the discharging edge is reached, such that only one conveyor belt is required to transfer the corresponding unit of the bulk material onto the second belt conveyor.

In a further preferred embodiment, the separating apparatus has a number of first, preferably optical, sensors for sensing the presence of units of the bulk material at the discharging edge. Preferably, the apparatus has one or more sensors for each conveyor belt of the first belt conveyor. Photoelectric barriers and/or 2D/3D laser scanners are preferably used as sensors.

The first sensors are preferably connected to the control device in a signal-conducting manner, wherein the control device is configured to stop the discharging conveyor belts in each case in dependence on a representative signal from the first sensors that a unit of the bulk material transported thereon has reached the discharging edge. In other words, the first sensors are configured to transmit a representative signal, for example in the form of a voltage change at the signal output, to the control device when they have sensed that a unit of the bulk material has reached the discharging edge.

In a further preferred configuration, the control device is configured to designate those discharging conveyor belts of the first belt conveyor on which a unit of the bulk material is arranged at the discharging edge as active discharging conveyor belts, and to set the active discharging conveyor belts sequentially in motion. As a result of the interim stopping of the conveyor belts after the breakthrough edge has been reached, the electronic control device initially prevents units of the bulk material from being transferred to the second belt conveyor in an uncontrolled manner. As a result of the conveyor belts with bulk material at the discharging edge being designated as "active conveyor belts", the electronic control unit also creates the predictability of these conveyor belts directly transferring or discharging a unit of the bulk material onto the second belt conveyor upon being put into operation. As a result of a sequence being maintained in the discharging and in the putting of the discharging conveyor belts into operation, the control unit also creates a predictability and more precise control of the discharging operation relative to the movement of the second belt conveyor.

The sequence of the discharging conveyor belts set in motion is preferably opposite to the conveying direction of the second belt conveyor. This means that that one of the conveyor belts designated as active that is arranged farthest downstream at the second belt conveyor is actuated first by the electronic control device to transfer the bulk material, followed by the next conveyor belt designated as active, which is arranged farther upstream relative to the previously activated conveyor belt at the second belt conveyor.

Since the conveyor belt activated in each case next is spaced apart from the conveyor belt activated in each case beforehand counter to the conveying direction of the second belt conveyor, the risk of aggregation of several units of the bulk material next to one another on the second belt conveyor is reduced further.

In a further preferred embodiment, the apparatus has a number of second, preferably optical, sensors which are configured to register the successful transfer of the units of the bulk material from the discharging edge to the second belt conveyor, preferably having at least one sensor for each conveyor belt. Photoelectric barriers and/or 2D/3D laser scanners are preferably provided here, too.

The second sensors are preferably connected to the control device in a signal-conducting manner, and the control device is configured to keep the discharging conveyor belts put into operation in operation at least until it has received a representative signal for the successful transfer of the bulk material onto the second belt conveyor from the second sensors.

In a particularly preferred embodiment, the control device is configured to start a conveying cycle, within which the discharging conveyor belts that are designated as active are set in motion after a predetermined time interval X. The conveying cycle is started as soon as a first discharging conveyor belt has been designated as active. In other words, the control device starts the conveying cycle as soon as a parcel has reached the discharging edge on any conveyor belt—regardless of which.

The invention is also developed in that it has a number of third, preferably optical, sensors which are configured to sense the presence, and preferably position in the conveying direction, of units of the bulk material on the second belt conveyor.

In this embodiment, photoelectric barriers and/or 2D/3D laser scanners are provided as optical sensors, which are positioned at predetermined distances apart in the conveying direction of the second belt conveyor. Whenever the third sensors sense the presence of a unit of the bulk material, they transmit a representative signal to the control device (and to this end are connected to the control device in a signal-conducting manner). Provided that the sensors are clearly identified with respect to the electronic control device, the system is thus also aware of the position along the second belt conveyor at which a unit of bulk material is currently being conveyed with each representative signal. With the third sensors, the electronic control device is also capable of sensing how uniform the distribution of the bulk material on the second belt conveyor already is when the conveying cycle is adhered to. Together with a known conveying speed of the second belt conveyor and the time interval between the representative signals of in each case one of the third sensors, the electronic control device is preferably configured to determine the gaps between in each case adjacent units of the bulk material on the second belt conveyor.

More preferably, the control device is configured to stop the conveying cycle in dependence on a representative signal from the third sensors as soon as the last active conveyor belt in the row has deposited a unit of the bulk material on the second belt conveyor. To this end, preferably one of the third sensors is positioned such that it only emits a representative signal when that conveyor belt of the first belt conveyor that is positioned farthest upstream has transferred a unit of the bulk material onto the second belt conveyor, and this unit of the bulk material is conveyed past that sensor on the second belt conveyor.

Following completion of the conveying cycle, the bulk material transferred onto the second belt conveyor is then conveyed away, specifically preferably at least far enough for it to be possible for the next conveyor belts designated as active to transfer fresh bulk material onto the second belt conveyor again without any risk of overlapping and aggregation of units of the bulk material on the second belt conveyor.

Accordingly, the control device is preferably configured to enable a new conveying cycle only from the moment at which none of the third sensors sense, for the duration of at least one time interval X, any presence of bulk material upstream of that conveyor belt of the first belt conveyor that is located farthest downstream in the conveying direction of the second belt conveyor and is designated as active. In other words, if none of the third sensors sense any presence of bulk material upstream of the first conveyor belt designated as active for a time interval X, the control device identifies the second belt conveyor as being empty.

Within further preferred embodiments, the control device is configured to use the representative signals from the third sensors to determine a distance between adjacent units of the bulk material on the conveyor belt. More preferably, the control device is configured to compare the determined distance between adjacent units of the bulk material on the conveyor belt with a predetermined threshold value.

More preferably, the control device is configured to identify a gap on the second belt conveyor when this threshold value is exceeded, and, preferably outside the time interval X, to set one or more further discharging conveyor belts, arranged farther downstream, in each case individually in motion such that one or more units of bulk material are transferred onto the second belt conveyor into the identified gap. If, for example, the third sensors and the electronic control device, cooperating as described above, identify a gap which has arisen because no article is present at the conveyor belts arranged a long way upstream along the second belt conveyor, the control device according to this embodiment is capable of directing the conveyor belts that are located farther downstream of the second belt conveyor, on which an article is present, but would no longer be taken into account in the current conveying cycle, to fill the gap. This further improves the uniformity and regularity of the separation and ideally makes manual filling of the gaps in subsequent process steps superfluous.

In a further preferred embodiment, the conveying direction of the second belt conveyor extends along a conveying axis, for example in the horizontal direction, and the second belt conveyor is inclined about this conveying axis. More preferably, the second belt conveyor has, on the side (transversely to the conveying direction) that is arranged lower down because of the inclination, a guide wall against which the bulk material located on the second belt conveyor comes to rest and along which the bulk material is conveyed. In other words, the second belt conveyor has a left-hand and right-hand side, of which, as seen transversely to the conveying direction, one side is arranged lower down than the other. The bulk material located on the second belt conveyor slides in the direction of the lower side after being transferred and comes to rest against the guide wall. In addition to being separated, the separated bulk material is already arranged in a row very early in the unloading operation. As a result, it is possible to at least partially dispense with such measures later on in the process sequence. In any case, such measures which serve to line up the separated units of the bulk material can be simplified considerably.

In a further preferred embodiment, the first belt conveyor has a number of feeding conveyor belts which are arranged upstream of the discharging conveyor belts, preferably directly adjoining the latter, and are configured to acquire the bulk material from a bulk material unloading apparatus. Preferably, each of the discharging conveyor belts of the first belt conveyor is assigned a feeding conveyor belt, and the electronic control device is configured to operate the mutually assigned conveyor belts in each case simultaneously, wherein preferably the discharging conveyor belts have a higher conveying speed than the feeding conveyor belts assigned to them. Alternatively, the discharging conveyor belts and the feeding conveyor belts can also be coupled mechanically, for example by way of speed increasing or speed reducing transmissions.

The apparatus according to the invention has been described thus far only with regard to the functional components and advantages of the first and the second belt conveyor. The apparatus according to the invention is in principle able to be coupled to any type of bulk material feed. In the simplest case, bulk material can be tipped onto a wide conveyor carpet which then conveys the bulk material to the first belt conveyor of the apparatus and transfers it onto the latter.

However, in a preferred configuration of the invention, the apparatus itself has a bulk material unloading apparatus for receiving bulk material, which is arranged upstream of the first belt conveyor, has a bulk material container which is pivotable into an end position inclined with respect to the horizontal, wherein the bulk material container has a tipping edge for transferring the bulk material onto the first belt conveyor, said tipping edge being arranged next to the first belt conveyor at least in an inclined end position of the bulk material unloading apparatus, and has a variable-height bottom surface which is arranged for pushing the bulk material in the direction of the tipping edge. The bulk material unloading apparatus can for example, but does not necessarily have to be configured on the basis of the model illustrated in WO 2013/087413 A1, mentioned at the beginning, in particular in FIGS. 1 to 11 therein.

In a preferred embodiment, the apparatus has a cross conveyor belt upstream of the first belt conveyor. The cross conveyor belt is preferably configured as a conveyor belt and drivable transversely to the conveying direction of the first belt conveyor. As a result, it is possible to move bulk material dispensed from the bulk material container laterally along the first belt conveyor, in order to distribute an agglomeration of bulk material for example in the rear or front region (with regard to the subsequently following second belt conveyor) of the tipping edge and discharging edge of the first belt conveyor. As a result, more uniform occupancy of the first belt conveyor is ensured, with the result that the efficiency of the apparatus for separating bulk material is increased overall.

Preferably, the bulk material unloading apparatus has a belt conveyor, and in particular, a trickle belt, for transferring the bulk material to the first belt conveyor. In a first preferred alternative, the belt conveyor for transferring the bulk material is arranged on the bulk material container at the tipping edge itself. In a second alternative, the belt conveyor for transferring the bulk material is arranged in a fixed upstream position adjoining the first belt conveyor. The latter configuration simplifies the structure and reduces the top-heaviness of the bulk material unloading apparatus.

If the bulk material unloading apparatus has both a cross conveyor and a belt conveyor for transferring the bulk material to the first belt conveyor, alternatively either the cross conveyor or the belt conveyor with the tipping edge is arranged in a manner adjoining the first belt conveyor. Particularly preferably, the cross conveyor is arranged downstream of the belt conveyor with the tipping edge.

In a further preferred embodiment, the bottom surface is adapted to receive a (single) load carrier, wherein the load carrier is adapted to the dimensions of the loading area of a commercial vehicle, and has a width in the range from about 2.4 m to 2.6 m and a length in the range from 7.0 m to 14.0 m.

Such load carriers are known as core components of a highly efficient logistics system for handling articles and are used to unload and load the loading areas of the commercial vehicles completely in an extremely short time. The apparatus according to this embodiment is configured in particular to participate as a functional component in such a logistics system in order to acquire articles delivered on load carriers, which are delivered on the load carrier, directly from the load carrier and to separate said articles. The bottom surface of the separating apparatus is preferably configured such that the load carrier can be received therein without jamming and tilting. The bottom surface preferably has a measurement of 5 mm to 10 mm in width and length.

In a further preferred configuration of the separating apparatus, a third belt conveyor is arranged downstream of the second belt conveyor, preferably directly adjoining the second belt conveyor, said third belt conveyor having a plurality of conveyor belts. The conveyor belts of the third belt conveyor are preferably each operable with individual conveying speeds and/or angled about a vertical axis, preferably in each case about 90°, with respect to the conveying direction of the conveying belt arranged in each case upstream.

By way of the individual controllability of the conveying speeds of the individual conveyor belts of the third belt conveyor, different functions can be realized. According to a first function, the conveying speeds of the conveyor belts of the third belt conveyor are set in a manner increasing successively in the conveying direction. The distance between two adjacent separated units of the bulk material is always increased a little from conveyor belt to conveyor belt along the third belt conveyor. In this way, the requisite minimum distance for further processing the separated goods of the bulk material can be set. According to a second functional design, the conveyor belts of the third belt conveyor can be driven such that any remaining gaps between two adjacent units of the bulk material are reduced in that the conveyor belts of the third belt conveyor that are located farther downstream have a slower conveying speed than the conveyor belts arranged in each case upstream. As a result, the distance between adjacent units of the bulk material can be reduced.

It has proved to be particularly advantageous to drive the individual conveyor belts of the third belt conveyor in clocked manner such that predetermined minimum distances are set between successive separated goods of the bulk material, particularly preferably approximately in a region of 50 cm or more.

In a preferred development of the apparatus according to the invention for separating bulk material, the apparatus has several third belt conveyors, which are each arranged downstream of corresponding further first belt conveyors and second belt conveyors. The third belt conveyors receive all the goods, already separated in operation, from originally disorganized bulk material agglomerations. For an efficient further processing process, it is particularly preferred for the conveyor belts of the third belt conveyors to be brought together in a combining portion and guided onto a common conveyor belt. To this end, the control device of the apparatus, or an additional control device, is preferably configured to temporally offset the article streams of the plurality of third belt conveyors with respect to one another such that the separated goods of the material streams of the plurality of third belt conveyors arrive on the common conveyor belt in a temporally offset manner and continue to maintain a predetermined minimum distance from one another after arriving on the common conveyor belt. Particularly preferably, the minimum distance on the common conveyor belt after unification is 50 cm or more. The greater minimum distances that may be necessary on the individual third belt conveyors are then preferably chosen to be correspondingly higher or the clocking of the conveyor belts of the third belt conveyors are correspondingly adapted.

The invention is directed, in its preferred embodiments, primarily at already achieving small to as far as possible no deviations in the separation and spacing of the bulk material on the second belt conveyor. Nevertheless, it is a preferred embodiment of the invention to drive the second belt conveyor with a variable speed in order optionally to also at least partially close those gaps that remain after the conveying cycle and gap filling upon transfer to the third belt conveyor.

BRIEF DESCRIPTION OF THE DRAWINGS

The present invention is described in more detail in the following text and with reference to the accompanying drawings, in which.

DETAILED DESCRIPTION

Figure 1:
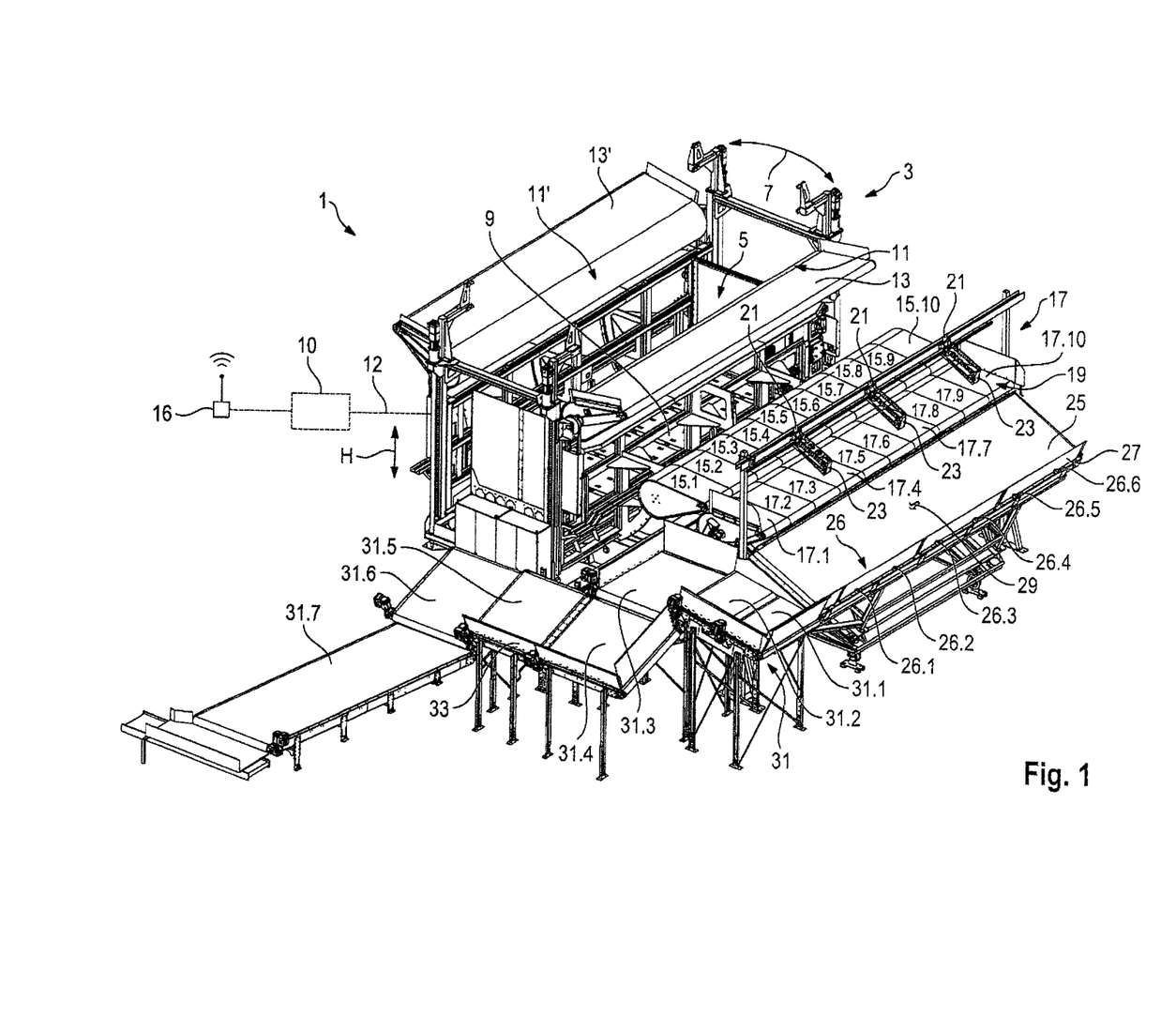
FIG. 1 shows a schematic three-dimensional illustration of an apparatus for separating bulk material according to a first exemplary embodiment.

FIG. 1 illustrates an apparatus 1 for separating bulk material from a bulk material container. The apparatus 1 comprises a bulk material unloading apparatus 3. The bulk material unloading apparatus 3 has a bulk material container 5. The bulk material container 5 is pivotable to the left or right in the direction of the arrow 7 from the horizontal orientation shown into an end position inclined with respect to the horizontal. The bulk material container 5 has a bottom surface 9 which is vertically movable in the direction of the arrow H for it to be possible to push bulk material located in the bulk material container 5 upward in the direction of a tipping edge 11 or 11', at least when the bulk material container 5 is located in the inclined end position. Located in the inclined end position is a belt conveyor 13 for transferring the bulk material to a first belt conveyor 17.

The first belt conveyor 17 contains a multiplicity of feeding conveyor belts 15.1 to 15.10. Assigned in each case to the conveyor belts 15.1 to 15.10 are the discharging conveyor belts 17.1 to 17.10 of the first belt conveyor 17. The feeding conveyor belts and the discharging conveyor belts respectively assigned thereto are preferably driven simultaneously, wherein the discharging conveyor belts 17.1 to 17.10 preferably run at a greater belt speed to spread out in the conveying direction the bulk material arriving to some extent still in piles on the feeding conveyor belts 15.1 to 15.10.

Arranged transversely to the conveying direction of the discharging conveyor belts 17.1 to 17.10, and adjoining the latter, is a second belt conveyor 25. The discharging conveyor belts 17.1 to 17.10 lead to the second belt conveyor 25 by way of a common discharging edge 19.

Figure 2:
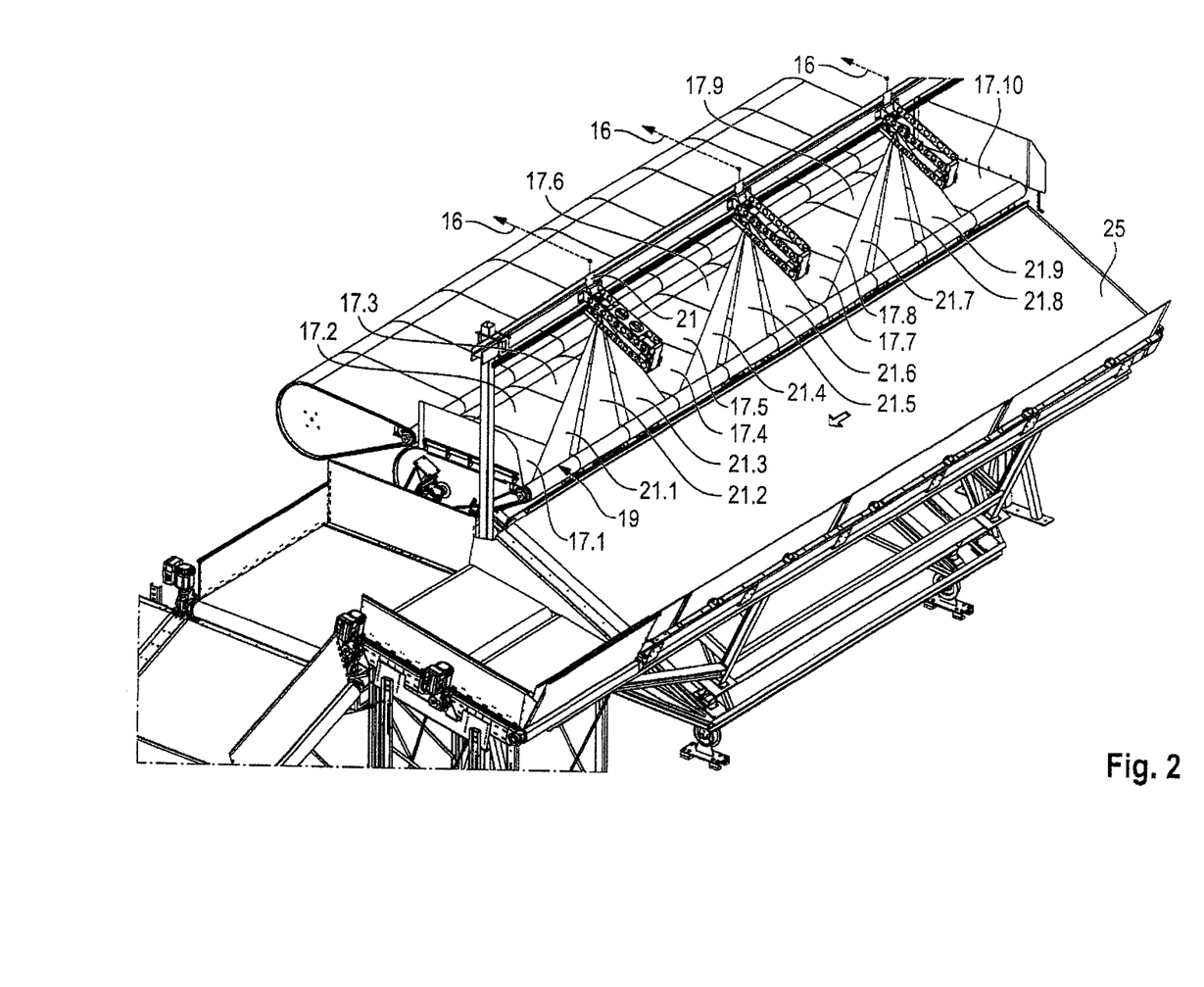
FIG. 2 shows a partial view of the apparatus from FIG. 1.

The common discharging edge 19 is scanned by a number of first sensors 21, which are preferably configured as photoelectric barriers or 2D/3D laser scanners (see FIG. 2).

Figure 3:
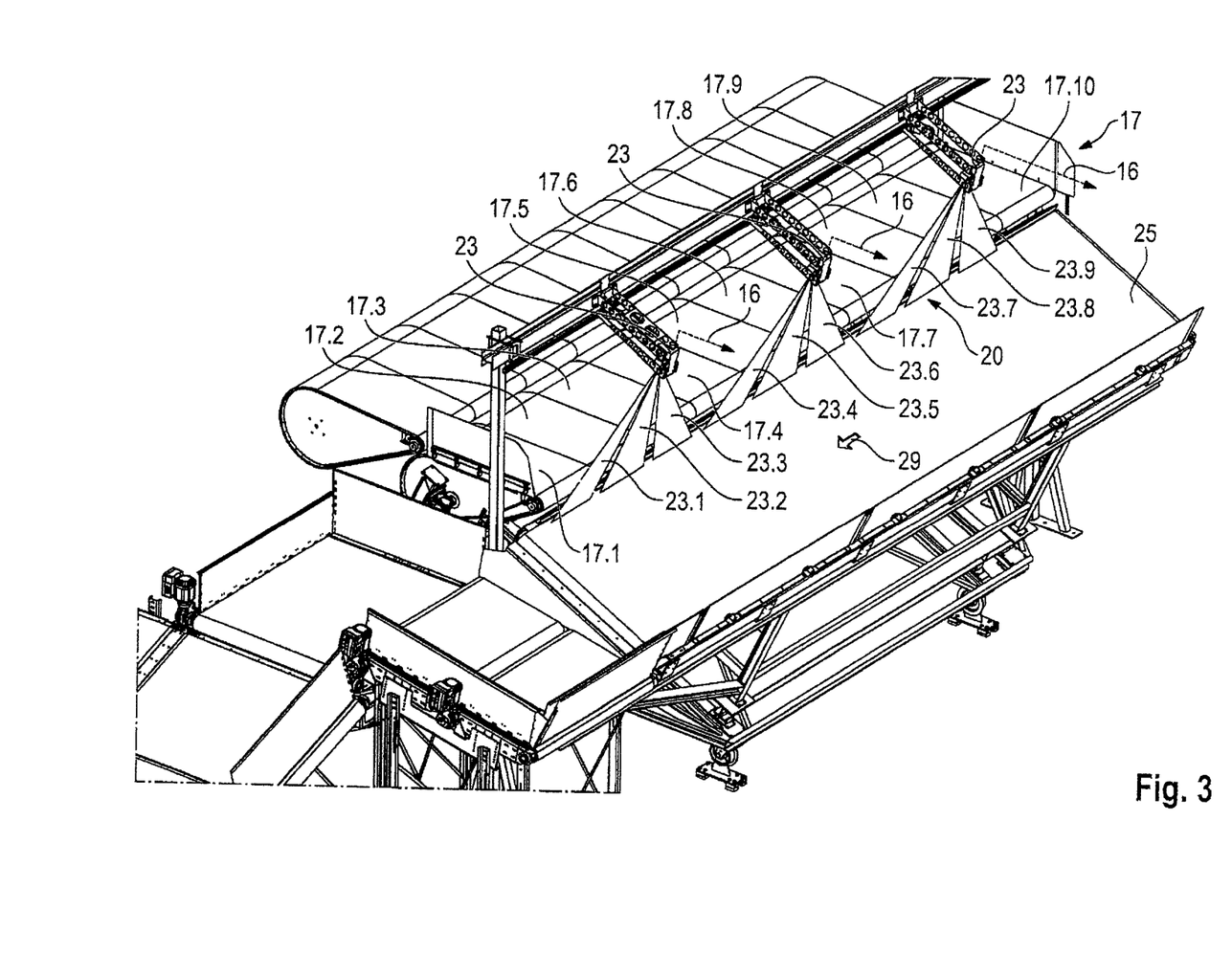
FIG. 3 shows the partial view according to FIG. 2 in a different stage of operation.

A peripheral region of the second belt conveyor 25 is scanned by a number of second sensors 23, which are preferably likewise configured as photoelectric barriers or 2D/3D laser scanners (FIG. 3).

The second belt conveyor is inclined transversely to a conveying direction 29 and has a guide wall 27 at the lower of its two side faces.

Arranged in the region of the guide wall 27 of the second belt conveyor 25 are a plurality of third sensors 26 (26.1 to 26.6), which are configured to sense the presence of bulk material on the second belt conveyor 25.

The first sensors 21, the second sensors 23 and the third sensors 26 are each connected in a signal-conducting manner to a signal input 16 of an electronic control unit 10. The electronic control unit 10 also has a control interface 12 for actuating the motorized functions of the apparatus 1 for separating bulk material. The electronic control device 10 is configured to control one, several or all the following units:

The first belt conveyor 17, the second belt conveyor 25, the bulk material unloading apparatus 3, and/or a third belt conveyor 31.

The third belt conveyor 31 is arranged downstream of the second belt conveyor 25 and has a multiplicity of conveyor belts 31.1 to 31.7. The conveying direction of the conveyor belts 31.1 and 31.2, 31.4, 31.5 is oriented transversely to the conveying direction 29 of the second belt conveyor, while the conveying direction of the conveyor belts 31.3, 31.6 and 31.7 is oriented substantially parallel to the conveying direction 29 of the second belt conveyor. The conveyor belts 31.4, 31.5 and 31.6 are inclined transversely to their conveying direction and have guide walls 33 which are configured to align the separate units of bulk material one after another.

In FIG. 1, only one set consisting of a first and second belt conveyor 17, 25 is illustrated on the apparatus 1. As can already be realized from the symmetrical layout of the bulk material unloading apparatus 3, however, the apparatus can be supplemented, in a mirror-symmetrical manner, on the left-hand side in FIG. 1, with a second set consisting of a first belt conveyor 17, second belt conveyor 25 and a part of the third belt conveyor 31, wherein the third belt conveyor would then be combined with the third belt conveyor 31 depicted here at the conveyor belts 31.6 and 31.7.

The manner of operation and further details can be gathered from the following FIGS. 2 to 6.

The arrangement and manner of operation of the first sensors 21 is schematically illustrated in FIG. 2. The sensors 21 scan the common discharging edge 19 at which the discharging conveyor belts 17.1 to 17.10 are aligned. The sensors 21 are configured, for example upon interruption of the photoelectric barrier 21.1 to 21.9 (sensor for the tenth track not illustrated), to transmit a representative signal to the signal input 16 of the electronic control unit 10. The electronic control unit 10 is configured, upon receiving such a representative signal, to stop the conveyor belt 17.*n* associated with the respective sensor 21.*n*, and to designate the stopped conveyor belt 17.*n* as "active conveyor belt".

The arrangement of the second sensors 23 is schematically illustrated in FIG. 3. The second sensors 23 preferably have a sensor, for instance a photoelectric barrier 23.1 to 23.*n*, for each conveyor belt 17.1 to 17.*n*. These are configured, in the event of an interruption or the end of the interruption, to transmit a representative signal to the signal input 16 of the control unit 10 to indicate that the unit of the bulk material that has been discharged from the respectively associated conveyor belt 17.*n* has arrived completely on the second belt conveyor 25. The conveying operation of the associated discharging conveyor belt 17.*n* is preferably maintained by the electronic control device 10 at least for this long.

The common line on which the second sensors 23 are preferably aligned is also denoted breakthrough line 20.

Figure 4:
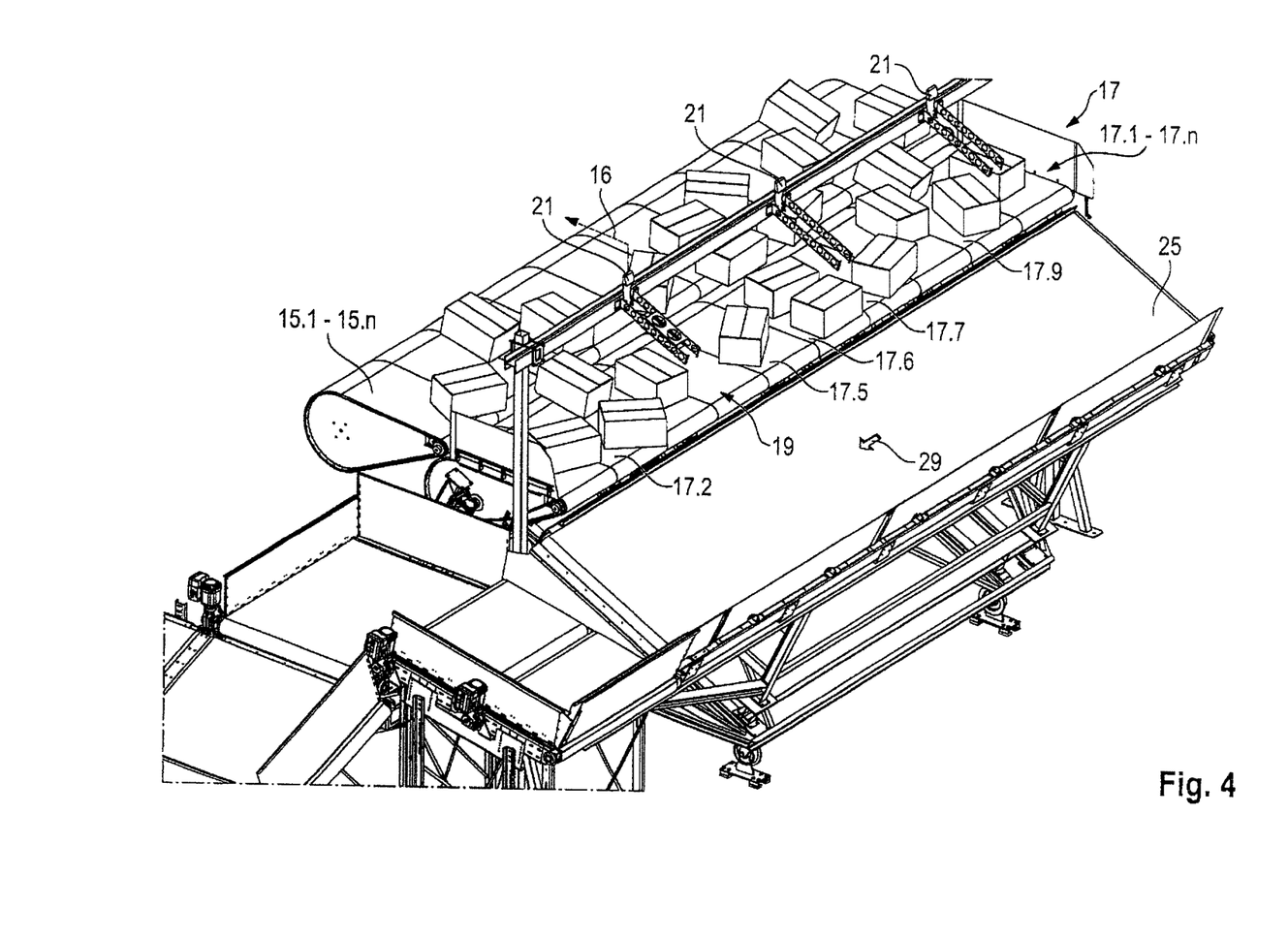
FIG. 4 shows the partial view according to FIGS. 2 and 3 in a different stage of operation.
Figure 5:
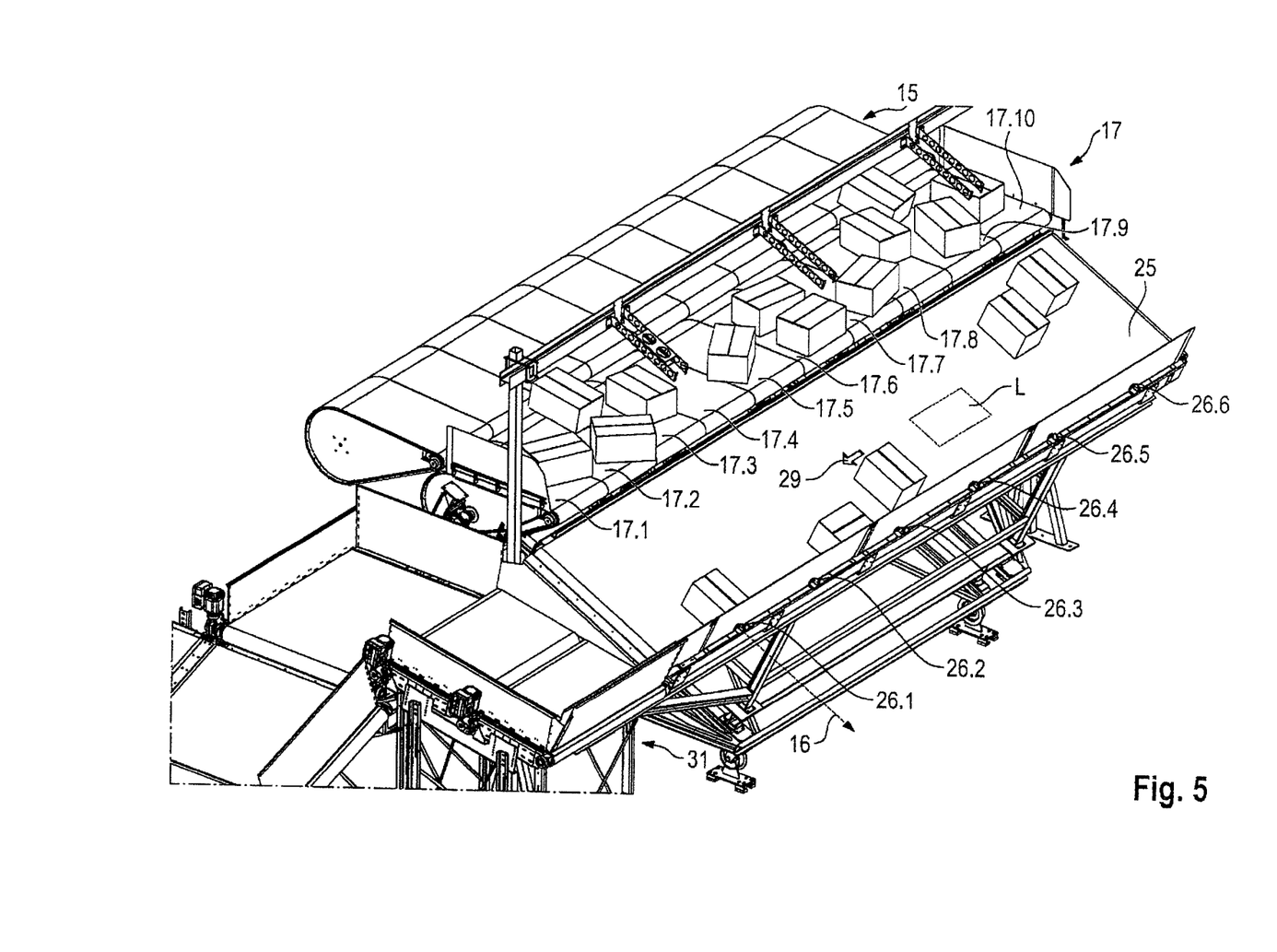
FIG. 5 shows the partial view in FIGS. 2 to 4 in a different stage of operation.
Figure 6:
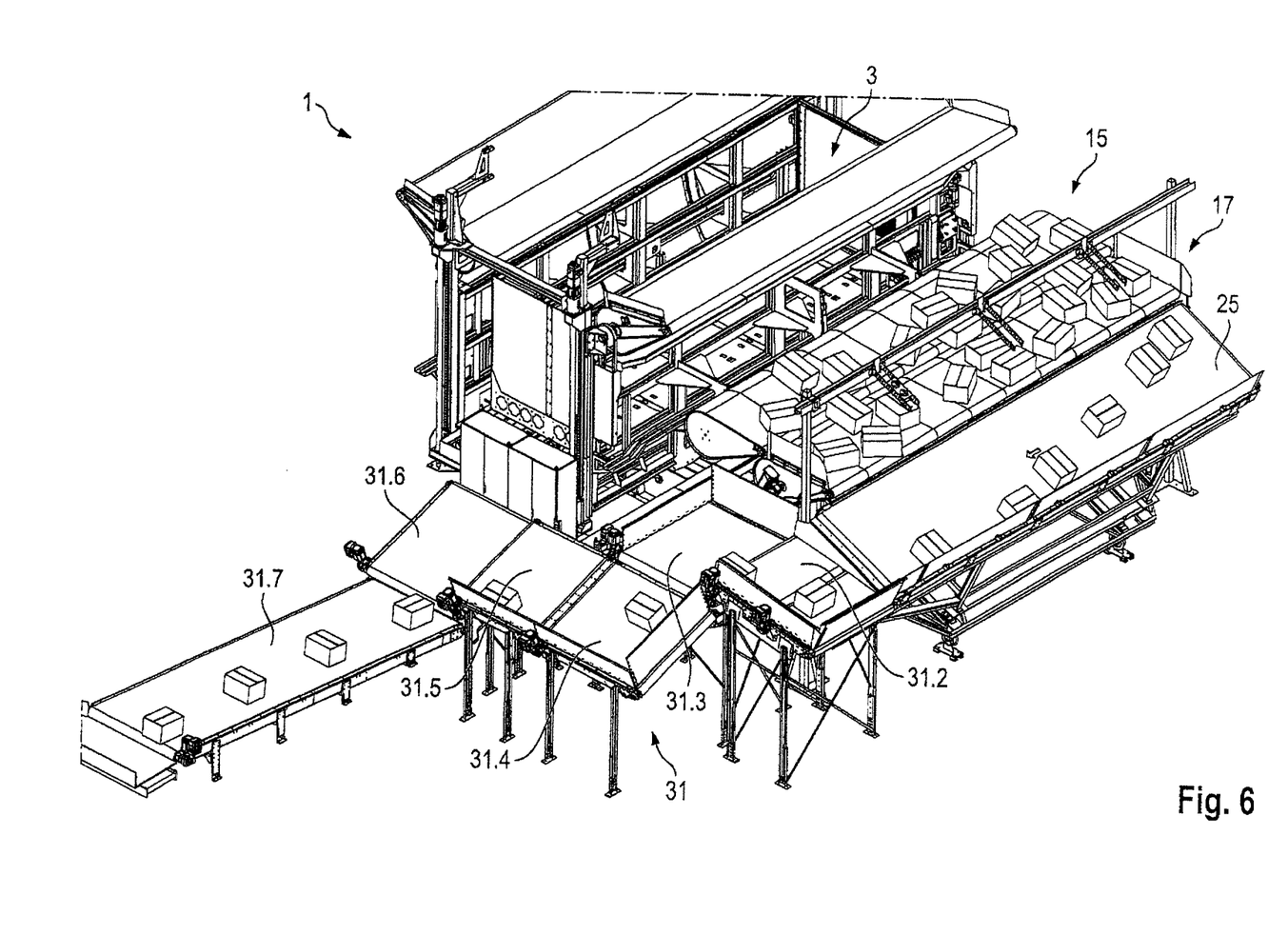
FIG. 6 shows a partial view of the apparatus according to the first preferred exemplary embodiment in yet another stage of operation.

With reference to the following FIGS. 4 to 6, the manner of operation of the apparatus 1 for separating bulk material is intended to be explained.

First, the system proceeds from a state in which bulk material, illustrated here in the form of packages, is transferred in a disorganized manner onto the first belt conveyor 17. The feeding conveyor belts 15.1 to 15.*n* are driven synchronously with one another and simultaneously with the discharging conveyor belts 17.1 to 17.*n*.

As soon as bulk material arrives at the discharging edge 19 on individual ones of the discharging conveyor belts 17.1 to 17.*n*, this is detected by the first sensors 21. Using the example in FIG. 4, the electronic control device stops the driving of the discharging conveyor belts 17.2, 17.6, 17.7 and 17.9, while the operation of the remaining discharging conveyor belts is continued.

When the starting preconditions exist, the electronic control device 10 starts a conveying cycle for the clocked discharging of bulk material onto the second belt conveyor 25. In the present exemplary figure, the discharging conveyor belts 17.2, 17.6, 17.7 and 17.9 are designated as "active" and the conveying cycle begins with the discharging conveyor belt 17.2. After fixed time intervals X, the next conveyor belt, designated as "active", for discharging the bulk material is then always enabled counter to the conveying direction 29 of the second belt conveyor. Using the example in FIG. 4, either the discharging conveyor belt 17.6 would be next after the discharging conveyor belt 17.2. However, if an intermediate discharging conveyor belt, for example the discharging conveyor belt 17.5, is designated as "active" during the time interval X, that discharging conveyor belt would be next after the time interval X has passed.

Each of the discharging conveyor belts that are not designated as "active" after a time interval X has passed or those discharging conveyor belts which are arranged further along in the conveying direction 29 of the second belt conveyor, are skipped in the conveying cycle. The conveying cycle is continued until the last discharging conveyor belt designated "active" has transferred a unit of bulk material onto the second belt conveyor 25.

It is possible, after the conveying cycle has been passed through, for example for a state to have been established on the second belt conveyor 25 according to FIG. 5. A multiplicity of units of the bulk material are already arranged on the second belt conveyor 25.

However, in the arrangement shown, the two third sensors 26.4 and 26.5 would not detect any presence of a unit of the bulk material for a particular time period. Because of the thus increased intervals between two successive signals from these two sensors 26.4 and 26.5, the electronic control device 10 is capable of identifying the presence of a gap L in the conveying stream on the second belt conveyor 25. Since there are still several conveyor belts designated as "active" downstream in the conveying direction 29, for example discharging conveyor belt 17.6 or discharging conveyor belt 17.2, the electronic control device 10 can instruct the operation of one of these discharging conveyor belts at the right time, taking the conveying speed of the second belt conveyor 25 into consideration, in order to transfer an additional unit of bulk material into the region L, in order to close the gap that has arisen.

Apart from the gap filling, however, proceeding from the state according to FIG. 5, first of all the conveyed material which is located on the second belt conveyor 25 is conveyed away in the direction of the third belt conveyor 31, until a state like the one in FIG. 4 has been reestablished. As soon as the bulk material on the second belt conveyor 25 has been conveyed at least so far that it is arranged downstream, in the conveying direction 29, of the highest rank discharging conveyor belt 17.1 to 17.10 designated as "active" (i.e. the one provided with the lowest reference number in FIG. 5), a new conveying cycle is not instructed by the electronic control device 10. The time for conveying away the bulk material from the second belt conveyor 25 is thus used by the first belt conveyor 17 to bring as many units of bulk material as possible to the discharging edge 19.

The second belt conveyor 25 can thus be operated substantially continuously, while the first belt conveyor 17 intermittently drives individual discharging conveyor belts 17.1 to 17.10 in conveying cycles, and thus delivers bulk material to the second belt conveyor 25 at discrete times. As a result, a virtually continuous operation of separating bulk material according to FIG. 6 is achievable, in which, starting from a disorganized pile of bulk material, early and effective separation takes place at discrete times, this subsequently resulting in separated units of the bulk material being arranged in a row at defined spacings via the third belt conveyor. The third belt conveyor ensures, through individual control of the individual conveyor belts, preferably with successively increasing conveying speed, and several deflections, that the separated goods are placed approximately one after another, thereby greatly simplifying mechanical further processing in downstream processes.

Figure 7:
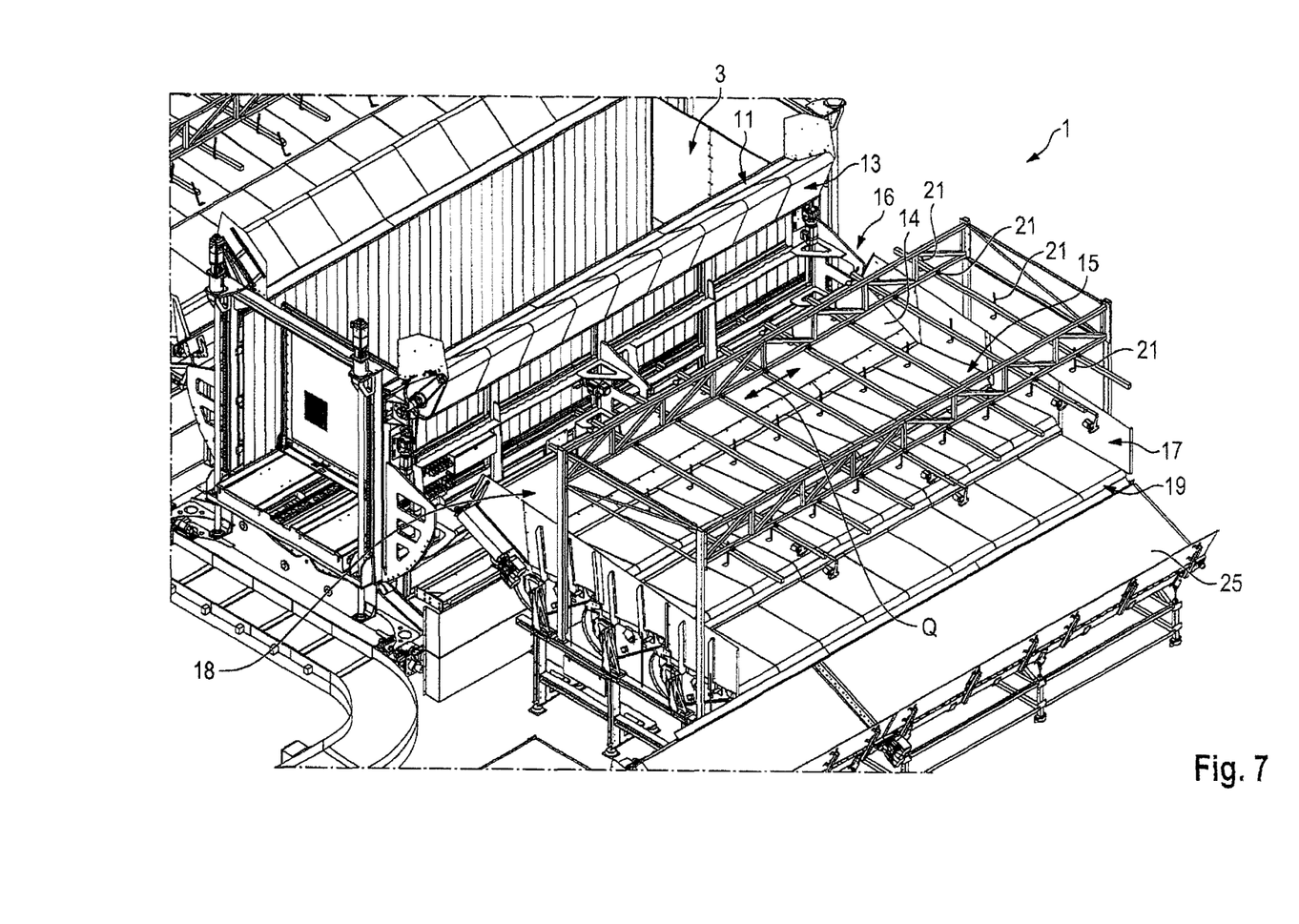
FIG. 7 shows a schematic three-dimensional illustration of an apparatus for separating bulk material according to a second exemplary embodiment.

FIG. 7 depicts an apparatus 1 for separating bulk material in the form of a second preferred embodiment. Structurally, the apparatus according to FIG. 7 is the same as the one in FIGS. 1 to 6, for which reasons the same reference signs have been used for identical or functionally identical components. Where the manner of operation is the same, reference is also made to the above explanation of FIGS. 1 to 6. The embodiment shown here is substantially compatible with the first embodiment according to FIGS. 1 to 6, for which reason the disclosure of the following additionally described features should also be understood as being compatible with and supplementing the embodiment according to FIGS. 1 to 6.

The apparatus 1 according to FIG. 7 has a cross conveyor 14 which is arranged upstream of the first belt conveyor 17 and downstream of the tipping edge 11 on the bulk material container 5. The cross conveyor 14 is preferably arranged in a manner directly adjoining the feeding conveyor belts 15 of the first belt conveyor 17 and drivable in the direction of the arrows Q. As a result, it is possible to resolve a potential agglomeration of bulk material in a first end region (reference sign 16) or in a second, opposite end region (reference sign 18) by appropriately driving the cross conveyor in the direction of one of the arrows Q and to distribute the bulk material uniformly along the tipping edge 11 or discharging edge 19 of the second belt conveyor 25.

The sensors 21 used in the second exemplary embodiment are configured not only for sensing the discharging edge 19, but rather the entire length of the first belt conveyor 17, and are preferably in the form of ultrasonic sensors. As a result of the entire surface region of the first belt conveyor 17 being sensed, even more precise sequencing and coordination of the discharging sequence at the discharging edge 19 is possible. In addition, the sensors are more cost-effective.

Figure 8:
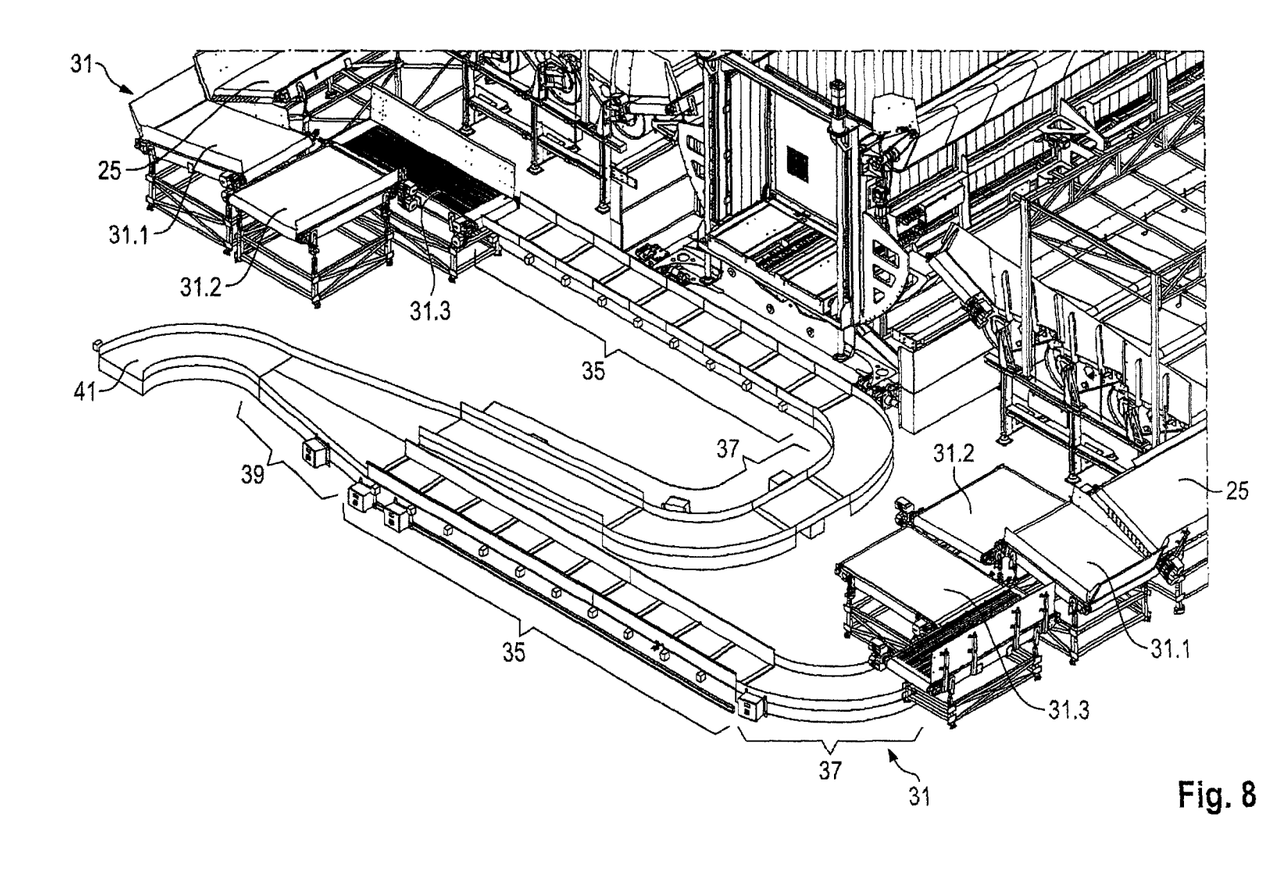
FIG. 8 shows a partial view of the apparatus according to FIG. 7.

As is already indicated in FIG. 7, the apparatus 1 according to the second exemplary embodiment has a second process branch, in which in each case a further first and second belt conveyor and a further cross conveyor and a further third belt conveyor are formed. FIG. 8 shows an exemplary arrangement of several third belt conveyors 31.

The configuration shown in FIG. 8 can also be realized in principle with a greater number of belt conveyors 31.

The conveyor belts 31.1, 31.2 and 31.3 directly downstream of the second belt conveyor 25 are primarily configured to orient the bulk material that arrives thereon at right angles, particularly preferably with the side of their greatest longitudinal extent in the conveying direction of the conveyor belt 31.3. To this end, the conveyor belts 31.1 to 31.3 each have corresponding impact walls.

Downstream, there follows a succession of timed belts 35 and buffer belts 37. In particular the timed belts 35 are configured to bring the successive items of bulk material to a predetermined minimum spacing and to spatially offset them with respect to one another such that they can be guided onto a common conveyor belt 41 in a combining region 39. For the clocking of the speeds of the belts 31.1, 31.2, 31.3, 35, 37, 39, 41, one or more electronic control devices are preferably configured, particularly preferably the control device 10 which has already been illustrated in FIGS. 1 to 6.

The contents described in the embodiments of the specification are merely used for particularizing the implementation forms of the present invention. The protection scope of the present invention should not be regarded as being merely limited to the specific forms stated in the embodiments, and the protection scope of the invention also includes equivalent technical means conceivable by those skilled in the art according to the conception of the present invention.

What is claimed is:

1. An apparatus for separating bulk material in the form of packages from a bulk material container, the apparatus comprising:
   a first belt conveyor for conveying the bulk material applied to the first belt conveyor from the bulk material container, and
   a downstream second belt conveyor, which defines a conveying direction that is angled relative to the conveying direction of the first belt conveyor, for conveying away the bulk material,
   wherein the first belt conveyor has a plurality of separately actuatable discharging conveyor belts arranged parallel to one another and having a discharging edge,
   wherein the apparatus has an electronic control device which is configured to drive the discharging conveyor belts in each case intermittently such that units of the bulk material are each transferred to the second belt conveyor at discrete time intervals and/or distances, and
   wherein the control device is configured:
      to designate those discharging conveyor belts of the first belt conveyor on which a unit of the bulk material is arranged at the discharging edge as active discharging conveyor belts, and
      to set the active discharging conveyor belts sequentially in motion, and wherein a sequence of the discharging conveyor belts set in motion is opposite to the conveying direction of the second belt conveyor.

2. The apparatus of claim 1, wherein the discharging conveyor belts of the first belt conveyor are arranged in a row next to one another along a common discharging edge facing the second belt conveyor, wherein the discharging edge is oriented with respect to the second belt conveyor such that the bulk material passes onto the second belt conveyor after passing over the discharging edge.

3. The apparatus of claim 2, further comprising:
   a number of first sensors for sensing a presence of units of the bulk material at the discharging edge, wherein the first sensors are optical sensors arranged such that there is at least one first sensor for each discharging conveyor belt.

4. The apparatus of claim 3, wherein the first sensors are connected to the control device in a signal-conducting manner, and the control device is configured to stop the discharging conveyor belts in each case in dependence on a representative signal that a unit of the bulk material transported thereon has reached the discharging edge.

5. The apparatus of claim 4, further comprising:
a number of second sensors which are configured to register a successful transfer of the units of the bulk material from the discharging edge to the second belt conveyor, wherein the second sensors are optical sensors arranged such that there is at least one second sensor for each discharging conveyor belt.

6. The apparatus of claim 5, wherein the second sensors are connected to the control device in a signal-conducting manner, and the control device is configured to keep the discharging conveyor belts in operation at least until the control device has received a representative signal for the successful transfer of the bulk material onto the second belt conveyor from the second sensors.

7. The apparatus of claim 6, wherein the control device is configured to start a conveying cycle, within which the discharging conveyor belts that are designated as active are set in motion after a predetermined time interval X, as soon as a first discharging conveyor belt has been designated as active.

8. The apparatus of claim 6, further comprising:
a number of third sensors which are configured to sense a presence and position in the conveying direction of units of the bulk material on the second belt conveyor, wherein the third sensors are optical sensors.

9. The apparatus of claim 8, wherein the third sensors are connected to the control device in a signal-conducting manner.

10. The apparatus of claim 9, wherein the control device is configured to stop the conveying cycle in dependence on a representative signal from the third sensors as soon as a last active discharging conveyor belt in the row has deposited a unit of the bulk material on the second belt conveyor.

11. The apparatus of claim 10, wherein the control device is configured to use the representative signals from the third sensors to determine a distance between adjacent units of the bulk material on the second belt conveyor, and
wherein the control device is configured to compare the determined distance between adjacent units of the bulk material on the second belt conveyor with a predetermined threshold value.

12. The apparatus of claim 11,
wherein the control device is configured:
to identify a gap on the second belt conveyor when the threshold value is exceeded, and,
to set one or more further discharging conveyor belts in each case individually in motion such that one or more units of bulk material are transferred onto the second belt conveyor into the identified gap.

13. The apparatus of claim 8, wherein the control device is configured to identify the second belt conveyor as being empty when none of the third sensors sense any presence of bulk material upstream of the first conveyor belt designated as active for the time interval X.

14. The apparatus of claim 1, wherein the conveying direction of the second belt conveyor extends along a conveying axis, the second belt conveyor is inclined about the conveying axis, and has a guide wall on the side.

15. The apparatus of claim 1, wherein the first belt conveyor has a number of feeding conveyor belts which are arranged upstream of and directly adjoining the discharging conveyor belts, and the feeding conveyor belts are configured to acquire the bulk material from a bulk material unloading apparatus; and
wherein each of the discharging conveyor belts of the first belt conveyor is assigned a feeding conveyor belt, and the electronic control device is configured to operate the mutually assigned conveyor belts in each case simultaneously, wherein the discharging conveyor belts have a higher conveying speed than the feeding conveyor belts assigned to them.

16. The apparatus of claim 1, further comprising:
a bulk material unloading apparatus for receiving bulk material, which
is arranged upstream of the first belt conveyor,
has a bulk material container which is pivotable into an end position inclined with respect to the horizontal, wherein the bulk material container,
has a tipping edge for transferring the bulk material onto the first belt conveyor, the tipping edge being arranged next to the first belt conveyor at least in an inclined end position of the bulk material unloading apparatus, and
has a variable-height bottom surface which is arranged for pushing the bulk material in the direction of the tipping edge,
wherein the bulk material unloading apparatus also includes a belt conveyor, in the form of a trickle belt, for transferring the bulk material to the first belt conveyor; and
wherein the belt conveyor for transferring the bulk material is arranged on the bulk material container at the tipping edge; or is arranged in a fixed upstream position adjoining the first belt conveyor.

17. The apparatus of claim 1, wherein a third belt conveyor is arranged downstream of the second belt conveyor, with the third belt conveyor directly adjoining the second belt conveyor, the third belt conveyor having a plurality of conveyor belts, which:
are each operable with individual conveying speeds, and/or
are angled about a vertical axis, and more specifically about 90°, with respect to the conveying direction of the conveyor belt arranged in each case upstream,
wherein the conveyor belts of the third belt conveyor exhibit an increasing conveying speed successively in the conveying direction.

18. The apparatus of claim 1, wherein the control device is configured to drive the second belt conveyor at a variable speed.

19. The apparatus of claim 1, wherein the conveying direction of the downstream second belt conveyor is oriented transverse relative to the conveying direction of the first belt conveyor.

* * * * *